March 15, 1938. C. C. BOLYARD 2,111,109
DECORATIVE ARTICLE AND METHOD OF MAKING IT
Filed July 6, 1937
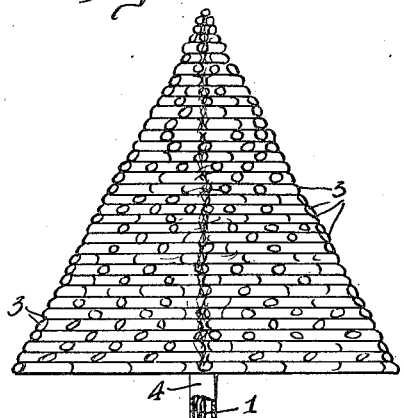
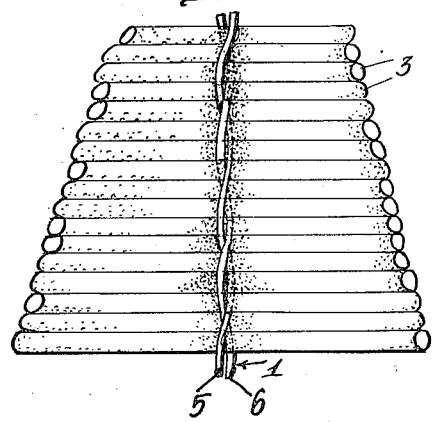
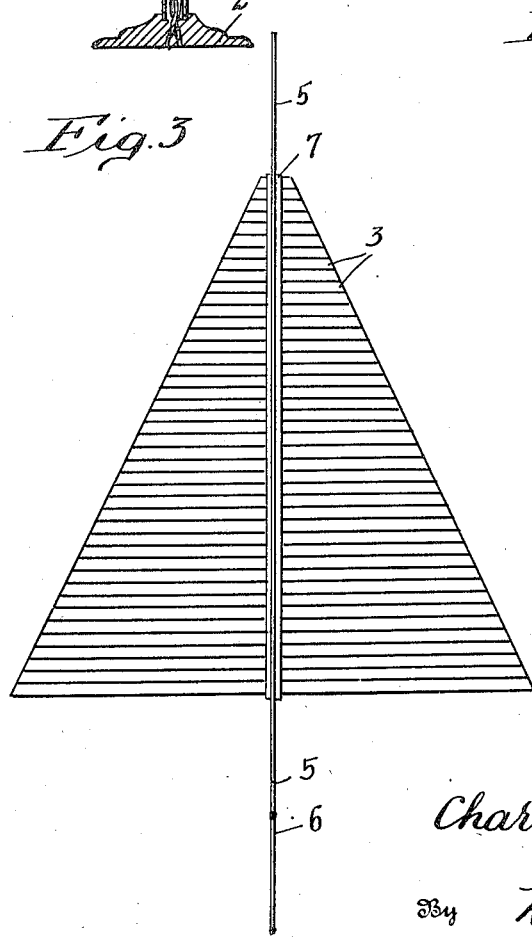
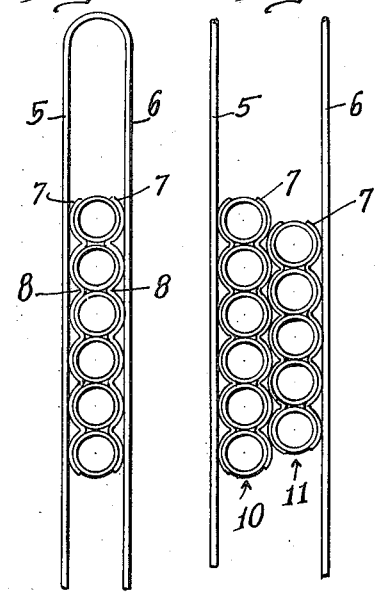
Inventor
Charles C. Bolyard Patented Mar. 15, 1938

2,111,109

UNITED STATES PATENT OFFICE 2,111,109

DECORATIVE ARTICLE AND METHOD OF MAKING IT

Charles C. Bolyard, Los Angeles, Calif., assignor to Paper Supply Company, Los Angeles, Calif., a corporation of California Application July 6, 1937, Serial No. 152,002

9 Claims. (Cl. 41—10)

This invention relates to decorative articles or ornaments, and particularly to such devices formed out of straws or tubes of translucent, yieldable, decorative material, such as "Cellophane".

A broad object of the invention is to provide a novel assembly of translucent straws having an unusual and attractive appearance.

Another object is to provide a decorative structure which is relatively inexpensive to produce.

A more specific object is to provide a simple and effective method of assembling and supporting translucent decorative straws to produce novel and attractive decorative structures.

In accordance with my invention, I produce decorative structures of various outlines, but consisting essentially, of a large number of decorative straws or tubes radiating from a central longitudinal axis, these straws extending in all radial directions from the axis.

By suitably proportioning the length of the straws employed, articles of various outlines may be easily prepared. In general, the straws at any longitudinal point along the axis, are preferably of substantially the same length so that the figures produced are in the shape of solids of revolution. However, this is not essential, and, if desired, straws may be of various lengths to produce any particular desired effect. The invention is particularly useful in producing ornaments simulating trees, particularly trees of symmetrical outline with respect to a central trunk.

The invention will now be explained by describing in detail an ornament of particular shape and the method of making it. It will be obvious to those skilled in the art that many departures from the particular structure to be described can be made in accordance with the invention, and the latter is to be limited only to the extent set forth in the appended claims.

In the drawing:

Fig. 1 is a side elevation view with portions shown in section of an artificial Christmas tree constructed in accordance with the invention.

Fig. 2 is an enlarged, detail elevational view of a portion of the tree shown in Fig. 1 to better illustrate the manner in which the individual straws comprising the tree, are supported.

Fig. 3 is a plan view of a layer of straws assembled in accordance with the preliminary steps to be followed in constructing a tree as shown in Fig. 1.

Fig. 4 is an enlarged detail cross section through a few of the straws shown in Fig. 3.

Fig. 5 is an enlarged detail cross section, similar to that of Fig. 4, but showing a double layer of straws for producing a thicker, or denser, ornament.

Referring first to Figs. 1 and 2, the ornament therein disclosed comprises a central vertical stem 1 supported at its lower end by attachment to a base 2 and having extending horizontally therefrom, along the upper portion of its length, a plurality of decorative straws 3, which straws are positively supported by the central stem 1, radiate therefrom in all horizontal directions, and are of gradually diminishing length from bottom to top so that in outline they have the general shape of a cone, simulating a conventional Christmas tree. That portion of the stem 1 below the lowermost straws 3 (which straws simulate the branches of the tree) may be enclosed and concealed within an ornamental covering 4.

Referring now to Fig. 2, the central stem 1 preferably comprises a pair of wires 5 and 6, respectively, twisted together as the strands of a rope or cable are twisted with the midpoints of the various straws 3 extending between and pinched between and gripped by the two wires 5 and 6. The straws 3 and wires 5 and 6 are assembled in a manner such that the straws 3 automatically rotate symmetrically in all directions from the twisted wires 5 and 6. The manner in which straws and wires are assembled into the shape shown in Figs. 1 and 2, will now be described with reference to Figs. 3 and 4.

Fig. 3 represents the first step in the manufacture of a tree as shown in Fig. 1. First a quantity of decorative straws 3 is laid alongside each other in a single continuous layer and secured together by sticking strips 7 thereto, these strips 7 extending transversely across the layer of straws 3, preferably along the center line of the layer of straws. Two strips 7 are preferably employed, one on each side of the layer of straws, as shown in Fig. 4. The strip 7 may be of various flexible materials, but it is usually preferable to employ a cellulose material similar in appearance and structure to the material of which the straws 3 are made. The strip 7 may be joined to the trees 3 by any suitable adhesive, either with or without heat. By employing heat to press the strips against the straw, a strong bond between the straws and the strips may be quickly obtained. Although it is not essential, I prefer to attach the strips 7 to the straws 3 over a substantial area, indenting these strips between adjacent straws, as indicated at 8 in Fig. 4.

When it is desired to produce a symmetrical ornament of the type shown in Fig. 1, the straws 3 are cut to a suitable length either before or after being bound together in a row by the strips 7 as shown in Fig. 3. The straws may be very readily cut off evenly, as shown in Fig. 3, with scissors or other cutting implements, after the straws have been connected together.

The next step in producing an ornament from the layer of straws bonded together by the strips 7, is to lay a pair of straight wires 5 and 6 against opposite sides of the layer of straws, these wires being laid against the strips 7. These wires 5 and 6 preferably project beyond the row of straws 3 at each end. The straws 3 are then clamped between the wires 5 and 6 and suitably spread in all directions from the wires by twisting the wires 5 and 6 together. This twisting operation may be readily accomplished by clamping the wires 5 and 6 at one end of the row of straws in any suitable vise or clamping mechanism, clamping the wires 5 and 6 at their other end of the row of straws between any other suitable clamping tool, and then twisting the latter. The twisting of the wires distorts them into the helical shape shown in Fig. 2 and at the same time the straws 3 are crushed by the wires at their point of passage between the wires and successive straws in the row are directed in slightly different directions radially from the wires 5 and 6 by virtue of the fact that the wires are twisted together. The wires 5 and 6 are preferably of some relatively stiff non-elastic material, such as soft iron, so that it readily retains the twist imparted to it and has little, or no, tendency to straighten out after the twisting force is removed.

At the completion of the twisting operation, the ends of the wires 5 and 6 adjacent the small end of the tree, may be cut off flush with the tip of the tree, the wires at the other, or base, end of the tree cut to a suitable length, and anchored in the base 2.

The strips 7 function to reinforce the straw material at the point of compression of the latter between the wires and also serve to prevent the straws from separating from each other along the length of the wires 5 and 6 during the twisting operation. They also simplify the construction of the device by preventing the straws from falling out of position during the application and twisting of the wires 5 and 6.

In the construction of the tree shown in Figs. 1 and 2, as described, only a single layer of straws 3 was employed. Such construction produces a very pleasing effect. However, it is possible to produce much denser structures, which for some purposes are more attractive, by employing two or even a greater number of layers of straw instead of a single layer.

Fig. 5 represents a view similar to that of Fig. 4, but in which two layers 10 and 11, respectively, of straws are positioned between the binding wires 5 and 6. Where more than one layer of straws is employed the straws in each layer are preferably individually joined together by strips 7 exactly as described with reference to Figs. 3 and 4. The straws in the successive layers are also preferably staggered relative to each other, as shown in Fig. 5, so that they fit together more closely, each row nesting into the other row.

As previously indicated, the invention has been explained by describing a specific embodiment thereof, but it is to be understood that the invention is in no sense limited to the manufacture of articles of the particular shape shown, and that articles of a great variety of shapes may be produced by employing straws of different relative lengths other than as shown in the drawing.

I claim:

1. As a new article of manufacture, an ornament comprising a central rigid elongated supporting member and a plurality of tubular straws supported by and extending radially from said supporting member and substantially symmetrically disposed about said supporting member as an axis.

2. As a new article of manufacture, an ornament comprising a central rigid elongated supporting member and a plurality of tubular straws supported by and extending radially from said supporting member and substantially symmetrically disposed about said supporting member as an axis, in which said elongated supporting member comprises a plurality of elongated helical elements coextensive with each other and interlocked with each other by virtue of their helical shape, and which said straws extend between and are gripped by said interlocked helical elements.

3. As a new article of manufacture, an ornament comprising a central rigid elongated supporting member and a plurality of tubular straws supported by and extending radially from said supporting member and substantially symmetrically disposed about said supporting member as an axis, in which said elongated supporting member comprises a pair of wire elements twisted together with the straws extending through the supporting member between said wire elements thereof, the straws being compressed between and thereby held by the twisted wire elements.

4. The process of making an ornamental structure comprising disposing a plurality of elongated tubular straws side by side in a flat mass, the straws being arranged in one or more continuous layers in said mass, placing elongated flexible elements in juxtaposed relation against opposite sides of said mass of straws, and extending transversely to the straws and deforming said flexible elements into interlocking helical relation about said straws by twisting the elements together, whereby the straws are crushed between the said elements at their points of contact therewith and the straws project from the twisted elements in all radial directions therefrom.

5. The process of making an ornamental structure comprising disposing a plurality of elongated tubular straws side by side in a flat mass, the straws in the mass being arranged in one or more distinct continuous layers therein, securing the straws in each layer against separating movement from each other, placing elongated flexible elements in juxtaposed relation against opposite sides of said mass of straws, and extending transversely to the straws and deforming said flexible elements into interlocking helical relation about said straws by twisting the elements together, whereby the straws are crushed between the said elements at their points of contact therewith and the straws project from the twisted elements in all radial directions therefrom.

6. The process of making an ornamental structure comprising disposing a plurality of elongated tubular straws side by side in a flat mass, the straws being arranged in one or more distinct continuous layers in said mass, securing the straws in each layer together with flexible strip material extending transversely across the straws, placing elongated flexible elements against opposite sides of said mass of straws in juxtaposed relation to each other and said straws, and deforming said flexible elements into interlocking helical relation about said straws by twisting the elements together, whereby the straws are crushed between the said elements at their points of contact therewith and the straws project from the twisted elements in all radial directions.

7. The process of making an ornamental structure comprising disposing a plurality of elongated tubular straws side by side in a continuous layer, sticking narrow and thin flexible strips to the straws in juxtaposed relation on opposite sides of said layer, said strips extending transversely of the straws and binding the straws together against separating movement, placing elongated flexible elements against opposite sides of said layer of straws in juxtaposed relation with each other and to said strips and deforming said flexible elements into interlocking helical relation to said straws by twisting the elements together whereby the straws are crushed between the said elements at their points of contact therewith and the straws project from the twisted elements in all radial directions.

8. The process of making an ornamental structure comprising disposing a plurality of elongated tubular straws side by side in a plurality of continuous layers, sticking narrow and thin flexible strips to the straws in each layer in juxtaposed relation on opposite sides of the layer, said strips extending transversely of the straws and binding the straws in each layer together against separating movement, superimposing said plurality of layers of straws on each other with said strips on different layers in superimposed relation, placing elongated flexible elements in juxtaposed relation against the opposite sides of the mass of straws comprising said superimposed layers of straws, and deforming said flexible elements into interlocking helical relation about said straws by twisting the elements together whereby the straws are crushed between the said elements at their points of contact therewith, and the straws project from the twisted elements in all radial directions.

9. As a new article of manufacture, an ornament comprising a central rigid elongated supporting member, and a plurality of "Cellophane" straws supported thereby and arranged longitudinally along a portion of the length of said supporting member, and extending radially therefrom and substantially symmetrically disposed about said supporting member as an axis.

CHARLES C. BOLYARD.